(12) United States Patent
Kang

(10) Patent No.: US 11,099,253 B2
(45) Date of Patent: Aug. 24, 2021

(54) METHOD AND APPARATUS FOR ESTIMATING DIRECTION OF ARRIVAL USING GENERATION OF VIRTUAL RECEIVED SIGNALS

(71) Applicant: HYUNDAI MOBIS CO., LTD., Seoul (KR)

(72) Inventor: Seok Hyun Kang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 315 days.

(21) Appl. No.: 16/241,808

(22) Filed: Jan. 7, 2019

(65) Prior Publication Data

US 2019/0212411 A1 Jul. 11, 2019

(30) Foreign Application Priority Data

Jan. 8, 2018 (KR) .................. 10-2018-0002532

(51) Int. Cl.
*G01S 5/02* (2010.01)
*G01S 3/46* (2006.01)
*G01S 3/32* (2006.01)
*G01S 13/42* (2006.01)
*G01S 7/35* (2006.01)

(52) U.S. Cl.
CPC .............. *G01S 5/0252* (2013.01); *G01S 3/32* (2013.01); *G01S 3/46* (2013.01); *G01S 13/42* (2013.01); *G01S 7/356* (2021.05)

(58) Field of Classification Search
CPC .......... G01S 13/42; G01S 13/931; G01S 3/46; G01S 5/04; G01S 2007/356; G01S 3/48; G01S 3/043; G01S 5/0221; G01S 7/354; G01S 2007/2883; G01S 13/584; G01S 7/352; G01S 13/003; G01S 7/292; G01S 2013/0245; G01S 3/32; H04B 7/086; H04W 64/00; H01Q 21/08; H01Q 21/061; H01Q 21/06; H01Q 21/0025; H01Q 3/40

See application file for complete search history.

(56) References Cited

U.S. PATENT DOCUMENTS

| | | | |
|---|---|---|---|
| 9,279,884 B2 * | 3/2016 | Chung ................ | G01S 13/4445 |
| 10,267,906 B2 * | 4/2019 | Kuo ...................... | G01S 13/931 |
| 2014/0334265 A1 * | 11/2014 | Yoo ...................... | G01S 3/8006 |
| | | | 367/118 |

(Continued)

FOREIGN PATENT DOCUMENTS

| KR | 10-2014-0142014 A | 12/2014 |
|---|---|---|
| KR | 10-2016-0134436 A | 11/2016 |

OTHER PUBLICATIONS

Office Action issued in corresponding Korean Patent Application No. 10-2018-0002532 dated May 14, 2021.

*Primary Examiner* — Olumide Ajibade Akonai
(74) *Attorney, Agent, or Firm* — Morgan, Lewis & Bockius LLP

(57) ABSTRACT

A received signal DOA estimation method using generation of virtual received signals includes: generating a preset number of virtual antennas at preset positions of a plurality of actual antennas; generating received signals received from the virtual antennas; and generating a DOA estimation value through a DOA estimation algorithm using the received signals received from the virtual antennas and the received signals received from the actual antennas.

16 Claims, 11 Drawing Sheets

(56) References Cited

U.S. PATENT DOCUMENTS

| | | | |
|---|---|---|---|
| 2015/0234033 A1* | 8/2015 | Jamieson | G01S 5/04 455/456.1 |
| 2016/0091595 A1* | 3/2016 | Alcalde | G01S 7/02 342/175 |
| 2016/0131752 A1* | 5/2016 | Jansen | G01S 13/343 342/27 |
| 2017/0285159 A1 | 10/2017 | Kuo et al. | |
| 2018/0088221 A1* | 3/2018 | Yomo | G01S 13/003 |
| 2019/0064339 A1* | 2/2019 | Kuo | H01Q 25/02 |

* cited by examiner

▽ : ACTUAL ANTENNA
✕ : VIRTUAL ANTENNA (a)

(b)

(c)

METHOD AND APPARATUS FOR ESTIMATING DIRECTION OF ARRIVAL USING GENERATION OF VIRTUAL RECEIVED SIGNALS

CROSS-REFERENCES TO RELATED APPLICATIONS

The present application claims priority to Korean application number 10-2018-0002532, filed on Jan. 8, 2018, which is incorporated by reference in its entirety.

BACKGROUND OF THE INVENTION

The present invention relates to a method and an apparatus for estimating a direction of arrival (DOA) using generation of virtual received signals, and more particularly, to a method and an apparatus for estimating a DOA using generation of virtual received signals, which are capable of estimating a DOA by generating a non-uniform linear array (NLA) using a virtual antenna based on a uniform linear array (ULA).

In a vehicle radar, when two vehicles in front are adjacent to each other at the same distance from a radar sensor, the radar must be able to recognize that there are two vehicles ahead, not one vehicle. It is important to accurately estimate a DOA of a received signal received from a target so as to separate multiple targets if the speeds and ranges of the targets are similar. High resolution received signal DOA estimation algorithms, such as a multiple signal classification (MUSIC) algorithm and an estimation of signal parameters via rotational invariance technique (ESPRIT) algorithm, have been studied for decades. Recently, a Bartlett algorithm, which is less influenced by a signal-to-noise ratio (SNR) than a MUSIC algorithm, has received much attention and is widely used.

When searching for a target using an ULA-type antenna, a narrow main beam width and a low side lobe are required to achieve precise resolution and high accuracy. When the aperture of the antenna array is wide, the beam width of the main lobe is narrow. The narrow beam width can identify closely adjacent targets. However, side lobes and grating lobes may occur and prevent positioning of the target. Further, the wide aperture of the antenna array occupies an excessively large space.

The background art of the present invention is disclosed in Korean Patent Application Publication No. 10-2016-0134436 (Nov. 23, 2016) entitled "Direction-of-Angle Estimation Apparatus and Direction-of-Angle Estimation Method Using the Same".

SUMMARY OF THE INVENTION

It is preferable to increase the number of antennas so as to increase the resolution in measuring the DOA of the received signal of the radar. However, if the number of actual physical antennas is increased, the space occupied by the antennas becomes wider. Therefore, instead of increasing the number of actual antennas, it is possible to obtain the effect of increasing the total number of antennas by making a virtual antenna using the actual antennas, but this method has limitations because the number of virtual antennas that can be increased is influenced by the number of actual antennas.

Embodiments of the present invention are directed to a method and an apparatus for estimating a DOA of a received signal using generation of virtual received signals, capable of increasing the number of virtual antennas that can be extended in a ULA antenna environment as compared with the related art, having a narrow beam width and a low side lobe at a limited antenna aperture size, generating no grating lobe, and further improving a DOA resolution of a received signal.

In one embodiment, a received signal DOA estimation method using generation of virtual received signals may include: generating a preset number of virtual antennas at preset positions of a plurality of actual antennas; generating received signals received from the virtual antennas; and generating a DOA estimation value through a DOA estimation algorithm using the received signals received from the virtual antennas and the received signals received from the actual antennas.

The virtual antennas may be disposed between the actual antennas or outside the actual antennas.

The virtual antennas may be disposed at unequal intervals, regardless of the positions of the actual antennas.

The set number may be set considering at least a signal-to-noise ratio (SNR) and the interval of the antennas.

The generating of the virtual antennas may include: setting a sector according to a field of view (FOV) angle range, generating a transform matrix through the set sector, and generating the received signals received from the virtual antennas by using the generated transform matrix; generating a correlation matrix by combining the received signals received from the virtual antennas and the received signals received from the actual antennas, generating an angle estimation spectrum by using the generated correlation matrix, and generating a DOA estimation value; and determining the set position by using a root mean square error (RMSE) of the DOA estimation value.

The determining of the set position may include determining the set position based on at least one of accuracy of the DOA estimation value and an area of a side lobe and a grating lobe.

The transform matrix may be obtained by using a linear least square (LLS) method based on a relationship between the received signals.

The DOA estimation algorithm may be a Bartlett pseudo algorithm.

In another embodiment, a received signal DOA estimation apparatus using generation of virtual received signals may include: a ULA reception antenna including a plurality of actual antennas; a reception unit configured to extract a predetermined signal from received signals received through the actual antennas of the ULA reception antenna and convert the extracted signal into a digital signal; and a signal processing unit configured to receive the digital signal from the reception unit, generate received signals received from a preset number of virtual antennas disposed at preset positions, and generate a DOA estimation value through a DOA estimation algorithm by using the received signals received from the actual antennas and the received signals received from the virtual antennas.

The virtual antennas may be disposed between the actual antennas or outside the actual antennas.

The virtual antennas may be disposed at unequal intervals, regardless of the positions of the actual antennas.

The set number may be set considering at least a signal-to-noise ratio (SNR) and the interval of the antennas.

The signal processing unit may be configured to set a sector according to a field of view (FOV) angle range, generate a transform matrix through the set sector, generate the received signals received from the virtual antennas by using the generated transform matrix, generate a correlation matrix by combining the received signals received from the virtual antennas and the received signals received from the actual antennas, generate an angle estimation spectrum by using the generated correlation matrix, generate a DOA estimation value; and determine the set position by using a root mean square error (RMSE) of the DOA estimation value.

The signal processing unit may be configured to determine the set position based on at least one of accuracy of the DOA estimation value and an area of a side lobe and a grating lobe.

The transform matrix may be obtained by using a linear least square (LLS) method based on a relationship between the received signals.

The DOA estimation algorithm may be a Bartlett pseudo algorithm.

DESCRIPTION OF SPECIFIC EMBODIMENTS

Figure 1:
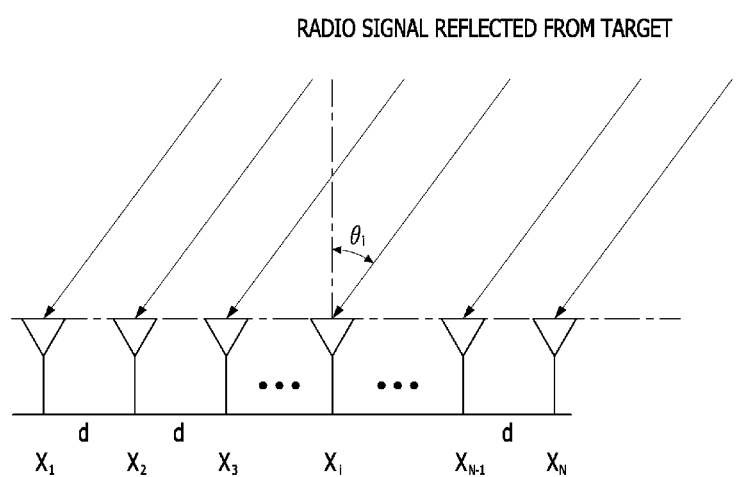
FIG. 1 illustrates a radio signal reception of a ULA antenna in which N antennas are arranged in the form of a ULA.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, a method and an apparatus for estimating a direction of arrival (DOA) using generation of virtual received signals in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
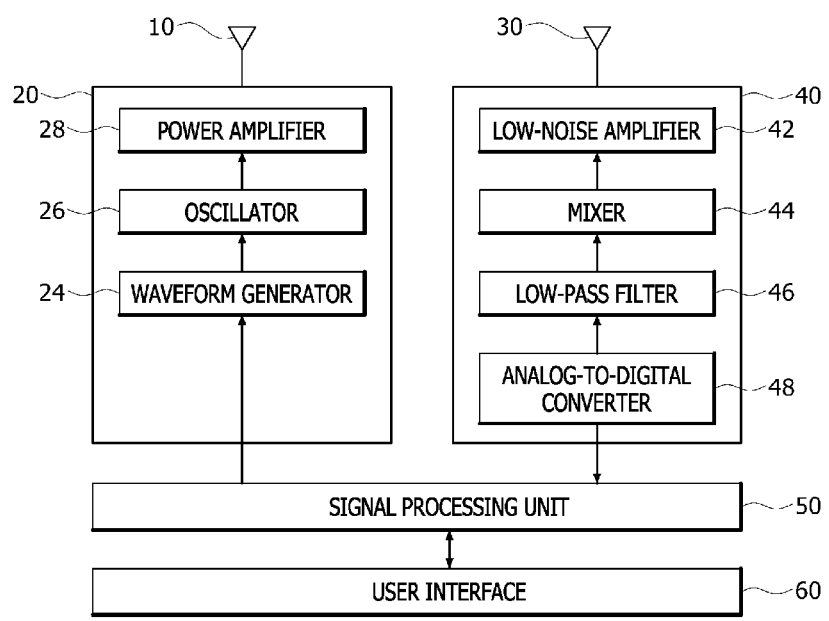
FIG. 2 is a block diagram of a DOA estimation apparatus using generation of virtual received signals in accordance with an embodiment of the present invention.
Figure 3:
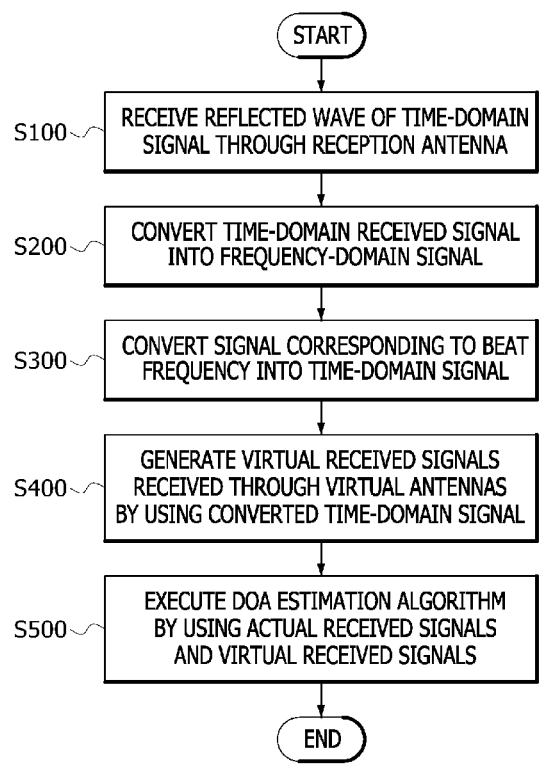
FIG. 3 is a flowchart of a DOA estimation method using generation of virtual received signals in accordance with an embodiment of the present invention.
Figure 4:
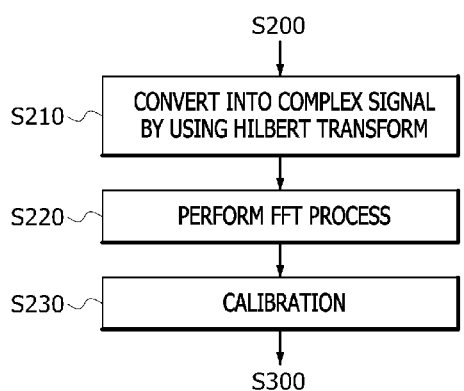
FIG. 4 is a diagram illustrating a specific execution procedure of step S200 of the flowchart of FIG. 3.
Figure 5:
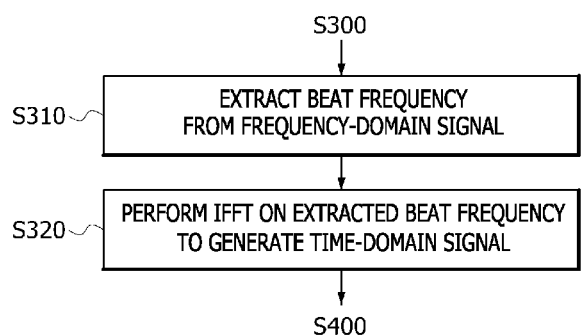
FIG. 5 is a diagram illustrating a specific execution procedure of step S400 of the flowchart of FIG. 3.
Figure 6:
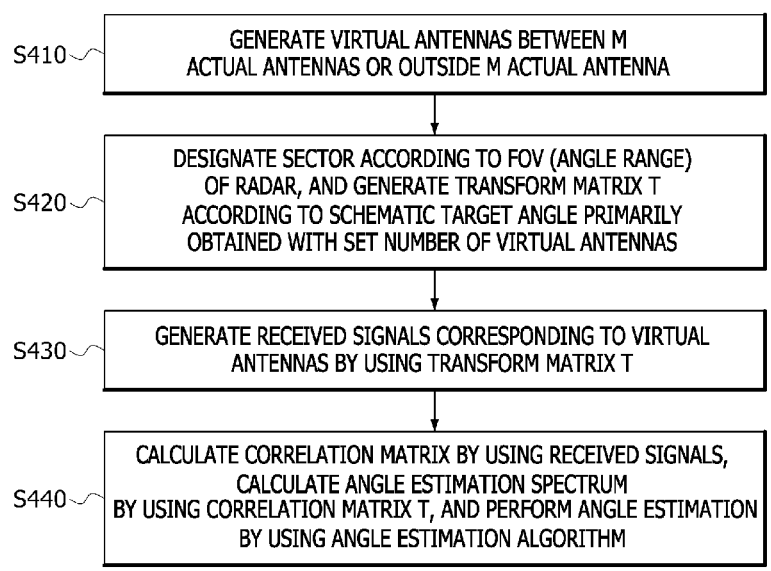
FIG. 6 is a diagram illustrating a specific execution procedure of step S500 of the flowchart of FIG. 3.
Figure 7:
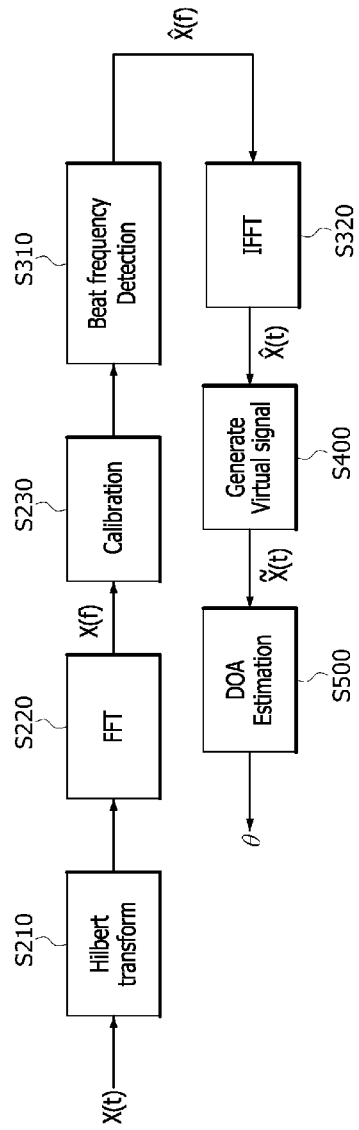
FIG. 7 is a diagram illustrating a calculation process for a DOA estimation value.
Figure 8:
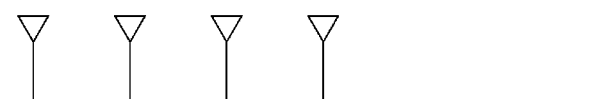
FIG. 8 is a conceptual diagram illustrating a method of increasing a virtual antenna received signal using a virtual antenna in accordance with an embodiment of the present invention.
Figure 8:
Figure 8:
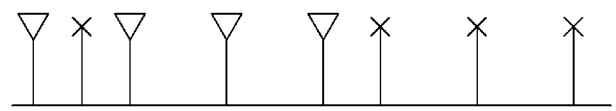

FIG. 1 illustrates a radio signal reception of a ULA antenna in which N antennas are arranged in the form of a ULA, FIG. 2 is a block diagram of a DOA estimation apparatus using generation of virtual received signals in accordance with an embodiment of the present invention, FIG. 3 is a flowchart of a DOA estimation method using generation of virtual received signals in accordance with an embodiment of the present invention, FIG. 4 is a diagram illustrating a specific execution procedure of step S200 of the flowchart of FIG. 3, FIG. 5 is a diagram illustrating a specific execution procedure of step S400 of the flowchart of FIG. 3, FIG. 6 is a diagram illustrating a specific execution procedure of step S500 of the flowchart of FIG. 3, FIG. 7 is a diagram illustrating a calculation process for a DOA estimation value, and FIG. 8 is a conceptual diagram illustrating a method of increasing a virtual antenna received signal using a virtual antenna in accordance with an embodiment of the present invention.

FIG. 1 illustrates that N antennas receive radio signals reflected from a front target in ULA antennas spaced apart at an equal interval d in a row. In such ULA antennas, a received signal x(t) can be expressed as follows:

$$\overline{x(t)} = As(t) + n(t) \quad (1)$$

$x(t) = [x_1(t), x_2(t), \ldots x_N(t)]^T$, $[.]^T$ is a transpose operator, and N is the number of antennas. $A = [a(\theta_1), a(\theta_2), \ldots a(\theta_L)]$ is a steering matrix. The steering matrix is composed of a steering vector $a(\theta_1)$ as follows:

$$a(\theta_i) = \left[ e^{j\frac{2\pi}{\lambda}d_1 \sin\theta_i}, e^{j\frac{2\pi}{\lambda}d_2 \sin\theta_i}, \ldots, e^{j\frac{2\pi}{\lambda}d_N \sin\theta_i} \right]^T \quad (2)$$

L is the number of targets, $\lambda$ is a wavelength of a receives signal of an antenna, $d_i$, is a distance to an $i^{th}$ antenna, $d_1=0$, $d_2=d, \ldots, d_N=(N-1)d$ since ULA is used in the embodiment of the present invention, and d is an antenna interval. $s(t) = [s_1, s_2(t), \ldots, s_L(t)]^T$ represents a Lx1 incident signal vector at time t, $n(t) = [n_1(t), n_2(t), \ldots, n_N(t)]^T$ represents a zero mean white Gaussian noise vector, and $\theta_i$ is an angle formed by a straight line forming a right angle with an extension line of a ULA antenna arrangement and an incident signal vector received from each antenna.

An autocorrelation matrix of a received signal may be estimated as follows:

$$R_{xx} = E[x(t) \cdot x^H(t)] \quad (3)$$

E[.] represents an expectation, $\overline{R_{xx}}$ represents a correlation matrix of a receives signal $x^{(t)}$, and $(.)^H$ represents a conjugate transpose operation. If a signal is ergodic (after a significant time elapses, one system is in a condition that returns to a state almost similar to an initial state), an ensemble average can be expressed as time average, and thus a self correlation matrix $\overline{R_{xx}}$ can be calculated using the time average.

$$R_{xx} = \frac{1}{K} \sum x(t) \cdot x^H(t) \quad (4)$$

K is the number of time samples.

The goal of the Bartlett algorithm is to determine a weighted vector that maximizes power of a received signal while constantly maintaining the magnitude of noise. An array output can be expressed as a value obtained by multiplying a weighted vector w by a received signal.

$$y(t) = w^H x(t) \quad (5)$$

w is an Nx1 weighted vector, and y(t) is a weighted output of a received signal. If there is a signal incoming at an angle θ, an array output can be expressed as follows:

$$p(w) = \max_w E[|y(t)|^2] = \max_w [|w^H x(t)|^2]$$
$$= \max_w w^H E[a(\theta)s(t)s^H(t)a^H(\theta) + n(t)n^H(t)]w \quad (6)$$
$$= \max_w \{E[|s(t)|^2]|w^H a(\theta)|^2 + \sigma_n^2 |w|^2\}.$$

$E[n(t)n^H(t)] = \sigma_n^2 I$, $\overline{\sigma_n^2}$ and represents a noise dispersion. |w|=1 so as to constantly maintain the magnitude of the noise component. Therefore, the solution of Equation (6) is as follows:

$$w = \frac{a(\theta)}{\sqrt{a^H(\theta)a(\theta)}} \quad (7)$$

An output spectrum of a Bartlett algorithm can be expressed as follows:

$$P(\theta) = \frac{a^H(\theta) R_{xx} a(\theta)}{a^H(\theta) a(\theta)} \quad (8)$$

FIG. 2 is a block diagram of a DOA estimation apparatus using generation of virtual received signals in accordance with an embodiment of the present invention.

The DOA estimation apparatus using generation of virtual received signals in accordance with an embodiment of the present invention may include a reception unit 40 connected to a ULA reception antenna 30, a transmission unit 20 connected to a ULA transmission antenna 10, and a signal processing unit 50 connected to the transmission unit 20 and the reception unit 40. The radar system 10 may further include a user interface 30 connected to the signal processing unit 50.

Each of the ULA reception antenna 30 and the ULA transmission antenna 10 may include a plurality of antennas. In particular, the ULA reception antenna 30 may have a ULA antenna arrangement in which a plurality of antennas are arranged at an equal interval in a row. A reflected signal returned when a radio frequency signal transmitted through the transmission antenna 10 is reflected from a front target may be received by the ULA reception antenna 30.

The transmission unit 20 wirelessly transmits a radar signal to the front target through the transmission antenna 10. In one embodiment, the transmission unit 20 may include a waveform generator 24, an oscillator 26, and a power amplifier 28. The waveform generator 24 may generate a signal having an analog waveform having a desired period and shape, based on a digital transmission signal provided by the signal processing unit 50. For example, the signal generator 24 may provide a demodulated signal (triangular wave) having a triangular waveform to the oscillator 26 as a transmission signal. The oscillator 26 may convert the transmission signal generated by the waveform generator 24 into a radio frequency (RF) signal having a high frequency in order for wireless transmission. For example, the oscillator 26 may perform frequency modulation of the transmission signal provided by the waveform generator 24. In addition, the oscillator 26 may provide the converted RF signal to a mixer 44 of the reception unit 40 as a reference signal. The power amplifier 28 may amplify the RF signal output by the oscillator 26 into power necessary for transmission and provide the amplified RF signal to the transmission antenna 10. The oscillator 26 may be configured by, for example, a voltage control oscillator (VCO).

The reception unit 40 receives the RF signal, which is reflected and returned from the front target after transmitted from the transmission antenna 10, through the reception antenna 30. The reception unit 40 may down-convert the RF signal based on the reference signal provided from the oscillator 26 of the transmission unit 20, convert the down-converted RF signal into a digital signal, and provide the digital signal to the signal processing unit 50. In one embodiment, the reception unit 40 may include a low-noise amplifier (LNA) 42, a mixer 44, and an analog-to-digital converter (ADC) 48 for each antenna constituting the reception antenna 30.

The low-noise amplifier 42 is connected to a corresponding antenna of the ULA reception antenna 30 and amplifies a slight reception signal received by the ULA reception antenna 30. The reception signal amplified by the low-noise amplifier 42 is provided to the mixer 44. The mixer 44 may down-convert the reception signal based on a frequency difference between the amplified reception signal and the RF signal provided from the oscillator 26 of the transmission unit 20. That is, the mixer 44 mixes the amplified reception signal and the RF signal provided from the oscillator 26 of the transmission unit 20, calculates a frequency difference between the two signals, and obtains a beat signal having the calculated difference frequency as a frequency. The beat signal obtained by the mixer 44 is converted into a digital signal by the ADC 48. The obtained digital reception signal is provided to the signal processing unit 50. The reception unit 40 may further include a low-pass filter (LPF) 46 for removing a low frequency component included in the beat signal output from the mixer 44.

In one embodiment, the signal processing unit 50 may control the overall operations of the transmission unit 20, the reception unit 40, and the user interface 30. The signal processing unit 50 may receive, from the reception unit 40, digital information corresponding to the signal reflected from the front target, perform arithmetic processing according to a method described below, and estimates a DOA of the received signal received from the front target. In addition, the signal processing unit 50 performs signal processing to generate information to be transmitted to the target through the transmission antenna 70, and provides the information to the transmission unit 20. The signal processing unit 50 may be implemented by, for example, a digital signal processor (DSP), a microcomputer, or the like.

The user interface (UI) 30 displays the processing result of the signal processing unit 50 or transmits a user instruction to the signal processing unit 50.

The configuration of the radar system 10 illustrated in FIG. 2 is merely an example, and may have other configurations according to modulation and demodulation schemes of the radio signal, or the like. The radar system 10 may be used as a vehicle radar device installed in a vehicle.

The virtual antenna signal generation method in accordance with the present invention may be implemented by a program. The program may be embedded in the signal processing unit 50 and executed thereby.

FIG. 3 is a flowchart of a process of estimating a DOA of a received signal based on a method in accordance with the present invention. FIG. 7 is illustrates a calculation process of estimating a DOA of a received signal based on a method in accordance with the present invention in the signal processing unit 50 of the radar system 10 of FIG. 2.

A method for estimating a DOA of a received signal in accordance with the present invention in the radar system 10 will be schematically described. In the radar system 10, the transmission unit 20 generates an RF signal and transmits the RF signal through the transmission antenna 10 based on a digital transmission signal provided by the signal processing unit 50. The RF signal transmitted to the target by transmission antenna 10 is collided and reflected from the front target. Each antenna of the ULA reception antenna 30 may receive the RF signal reflected and returned from the target, and transmit the RF signal to the reception unit 40. As described above, the reception unit 40 generates a beat signal based on a frequency difference between the RF signal received by each antenna 30 and the RF signal provided from the oscillator 26, convert the beat signal into a digital signal, and provides the digital signal to the signal processing unit 50 (step S100).

The reception signal provided to the signal processing unit 50 by the reception unit 40 is a time-domain signal. The time-domain signal is converted into a frequency-domain signal (step S200). The flowchart illustrated in FIG. 4 shows a detailed execution procedure of step S200 of the flowchart illustrated in FIG. 3. Referring to FIG. 4, the time-domain signal provided by the reception unit 40 may be converted into a complex signal using a Hilbert transform algorithm by the signal processing unit 50 (step S210). Then, the converted complex signal may be converted into a frequency-domain signal using a fast Fourier transform (FFT) algorithm (step S220). Calibration processing may be performed on the converted frequency-domain signal (step S230).

The signal corresponding to the beat frequency among the signals converted into the frequency domain may be converted again into the time-domain signal (step S400). The flowchart of FIG. 5 shows a detailed execution procedure of step S400. Referring to FIG. 5, the beat frequency signal is extracted from the frequency-domain signal obtained through the Fourier transform (step S310). Inverse fast Fourier transform (IFFT) is performed on the extracted beat frequency signal and the beat frequency signal is converted into the time-domain signal (step S420).

When the time-domain signal is obtained in this manner, a virtual received signal received through a virtual antenna is generated by using the converted time-domain signal (step S500).

When the virtual received signals of the desired number of virtual antennas are obtained, an algorithm for received signal DOA estimation is performed by using the virtual received signals and the received signal received through the actual physical antenna together (step S300).

In the embodiment of the present invention, the improved received signal DOA estimation algorithm is proposed which increases the resolution of the Bartlett algorithm by using the DOA estimation value by performing the DOA estimation algorithm, and reduces the level of the grating lobe and the side lobe. The conventional arrangement interpolation algorithm must sect a sector indicating a viewing range. When a target exists outside the sector, the conventional interpolation algorithm cannot accurately estimate the position of the target. In addition, an additional step must be performed so as to set the initial sector.

FIG. 6 is a diagram illustrating a specific execution procedure of step S500 of the flowchart of FIG. 3.

Referring to FIGS. 6 and 8, the execution procedure of step S500 of generating the virtual received signal will be described in more detail. FIG. 8 conceptually illustrates the method of the present invention which, when the ULA reception antenna 30 is implemented by four actual antennas arranged in a ULA form, generates the reception signals of the virtual antennas while the virtual antenna increases using the reception signals of the four actual antenna, and determines the optimum virtual antenna position, that is, the set position, based on them. The process (step S500) of generating the virtual reception signal will be described in more detail with reference to FIGS. 6 and 8.

First, as illustrated in FIG. 8A, when M actual antennas exist, a set number of virtual antennas are generated (S410).

The set number is the number of virtual antennas whose angular resolution has the maximum performance. In the present embodiment, four virtual antennas are employed.

The virtual antennas may be previously generated at various positions. For example, the virtual antennas may be arranged between actual antennas or outside the actual antennas by applying interpolation or extrapolation.

In addition, the virtual antennas may be arranged in unequal intervals, regardless of the position of the actual antenna.

A sector for using interpolation according to a field of view (FOV) of a radar is designated, and a transform matrix T is generated according to a schematic target angle primarily obtained with the set number of virtual antennas (S420). That is, the sector is primarily defined, and a secondary angel is readjusted with respect to the first estimated angle. As the sector is defined closely to the position of the actual target, the angle estimatio performance may be improved. In this case, the angle of the target may be estimated through a beamforming method.

As the sector is designated as described above, the reception signal received by the virtual antenna is generated by using the transform matrix T obtained through the sector.

In FIG. 8B, one of the set number of virtual antennas, that is, four virtual antennas, is disposed on the right side of the leftmost actual antenna by interpolation, and the remaining three antennas are disposed outside the actual antenna by extrapolation.

Meanwhile, as the signal received by the virtual antenna is generated, the signal received by the virtual antenna is mixed with the signal received by the actual antenna to generate a new correlation matrix, the angle estimation spectrum is generated by using the correlation matrix, and the angle is estimated through the angle estimation spectrum. In the present embodiment, the Bartlett pseudo spectrum may be employed as the DOA estimation algorithm.

Then, as illustrated in FIG. 7, a DOA estimation algorithm for received signal DOA estimation is performed by using the virtual received signals and the received signal received through the actual physical antenna together. The Bartlett pseudo spectrum may be employed as the DOA estimation algorithm.

As such, if the DOA estimation value is generated through the DOA estimation algorithm, the optimal combination, that is, the position of the virtual antenna, is set by using the root mean square error (RMSE) of the angle.

That is, as the condition for setting the position of the virtual antenna, the position having the best performance may be set as the set position as illustrated in FIG. 8C, based on the accuracy of the DOA estimation value and the area of the side lobe and the grating lobe.

For example, in a case in which the interval of the actual antennas is 1.8λ, if four virtual antennas are arranged at an interval of 0.1λ, a total of 8,214,570 combinations may be generated.

When the processes illustrated in FIG. 6 are performed on the generated combinations, the optimal combination may be determined based on the accuracy of the DOA estimation value and the area of the side lobe and the grating lobe.

TABLE 1

Area of grating lobe and side lobe with respect to each combination, and maximum angular resolution

| | $d'_1$ | $d'_2$ | $d'_3$ | $d'_4$ | GL/SL area | Maximum angular resolution |
|---|---|---|---|---|---|---|
| 1 | 1.0λ | 6.2λ | 7.0λ | 8.7λ | 77.01 | 6° |
| 2 | 2.5λ | 6.2λ | 7.0λ | 8.7λ | 81.41 | 6° |
| 3 | 4.4λ | 6.1λ | 8.6λ | 8.6λ | 81.46 | 6° |
| 4 | 1.0λ | 6.2λ | 8.9λ | 8.9λ | 96.99 | 6° |
| 5 | 1.0λ | 6.2λ | 9.0λ | 9.0λ | 98.01 | 6° |

In Table 1, $d'_1$ to $d'_4$ are positions of virtual antennas and correspond to the distance from the actual antenna disposed at the outermost among actual antennas. The GL/SL area is an area of grating lobe and side lobe.

Table 1 shows five combinations having the best performance among the 8,214,570 combinations.

In the above-described embodiment, since the interval of the actual antennas is 1.8λ, the total interval between four actual antennas is 5.4λ.

Therefore, in the case of the first, fourth, and fifth combinations, $d'_1$ is disposed between the first actual antenna and the second actual antenna (interpolation), and $d'_2$ to $d'_4$ are disposed outside the actual antenna (extrapolation).

In the second combination, $d'_1$ is disposed between the second actual antenna and the third actual antenna, and $d'_2$ to $d'_4$ are disposed outside the actual antenna.

In the third combination, $d'_1$ is disposed between the third actual antenna and the fourth actual antenna, and $d'_2$ to $d'_4$ are disposed outside the actual antenna.

Compared with the first combination to the fifth combination, the maximum angular resolutions of the first combination to the fifth combination are the same, but the first combination has the best performance since the first combination has the smallest area of the grating lobe and the side lobe.

Therefore, the positions of the four virtual antennas may be 1.0λ, 6.2λ, 7.0λ, and 8.7λ.

In accordance with embodiments of the present invention, the method for generating the virtual received signal using generation of virtual received signals can estimate DOA of the received signal at high resolution by applying the target detection radar device.

Figure 9:
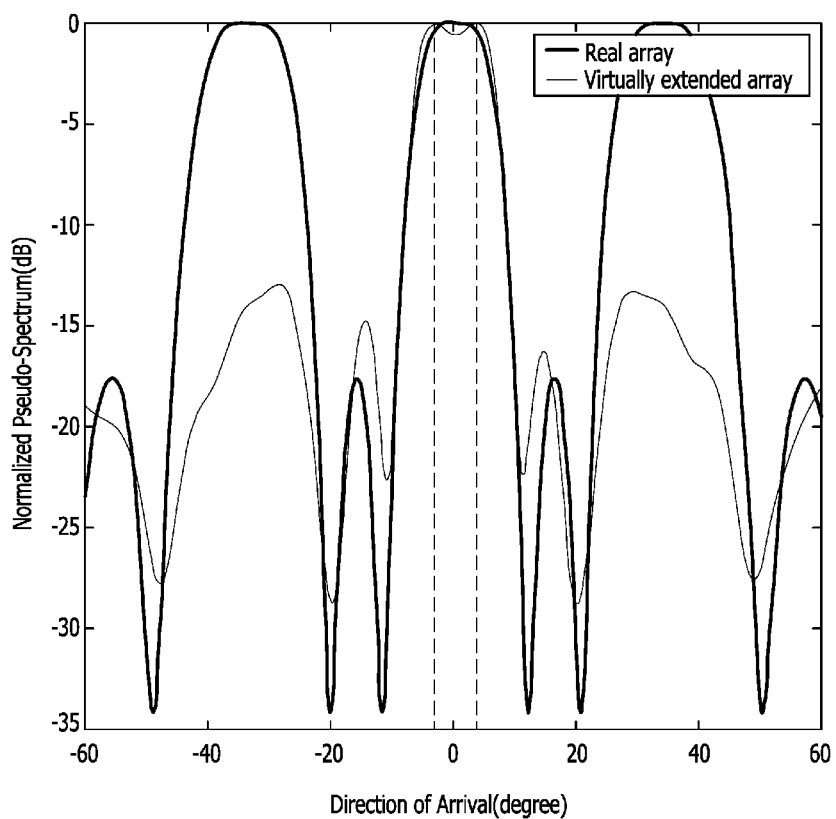
FIG. 9 is a diagram illustrating a Bartlett pseudo spectrum when a sector is set to [−15°, 15°] in accordance with an embodiment of the present invention.
Figure 10:
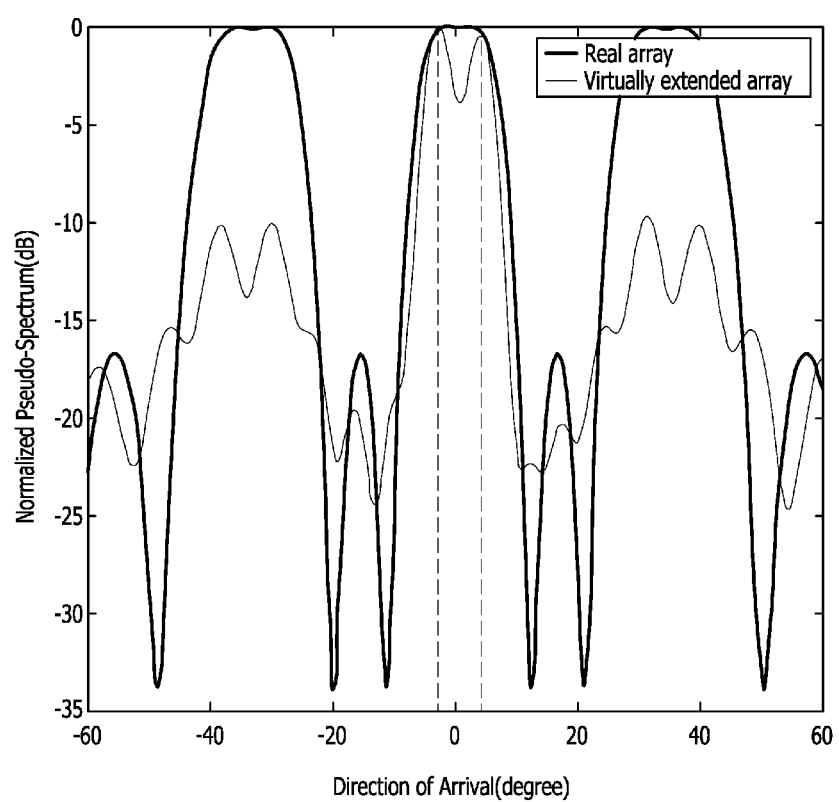
FIG. 10 is a diagram illustrating a Bartlett pseudo spectrum when a sector is set to [−5°, 5°] in accordance with an embodiment of the present invention.
Figure 11:
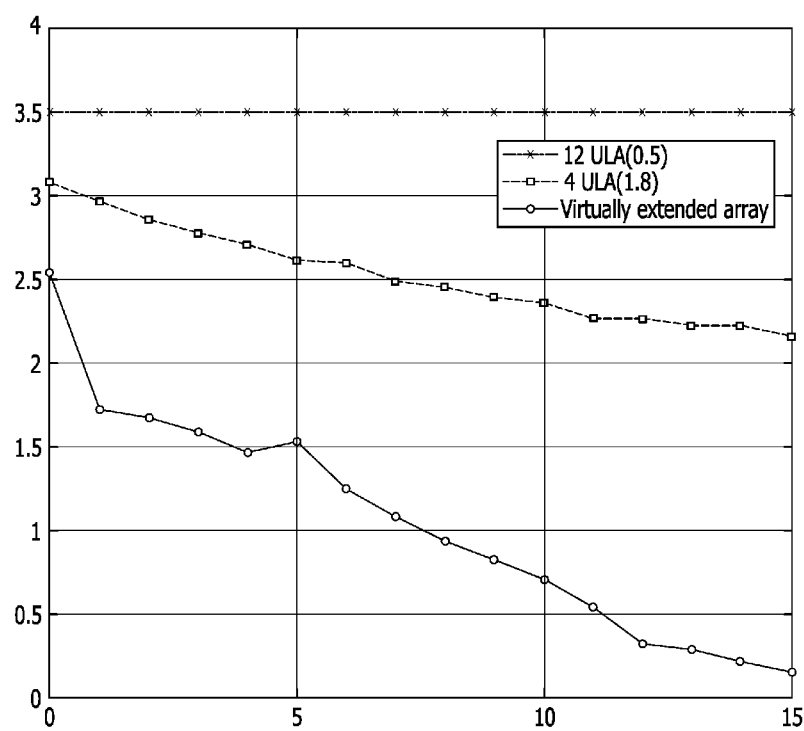
FIG. 11 is a graph illustrating a change in a mean square root error in accordance with an embodiment of the present invention.

FIG. 9 is a diagram illustrating a Bartlett pseudo spectrum when a sector is set to [−15°, 15°] in accordance with an embodiment of the present invention, FIG. 10 is a diagram illustrating a Bartlett pseudo spectrum when a sector is set to [−5°, 5°] in accordance with an embodiment of the present invention, and FIG. 11 is a graph illustrating a change in a mean square root error in accordance with an embodiment of the present invention.

FIG. 9 is a Bartlett pseudo spectrum when the sector is set to [−15°, 15°], and FIG. 10 is a Bartlett pseudo spectrum when the sector is set to [−5°, 5°]. As the sector is closer to the section in which the actual target exists, better performance is exhibited.

In addition, referring to FIG. 11, compared with the performances of three arrays (12ULA, 4ULA, virtually expended array) having similar array aperture sizes, the performance of the proposed array is relatively excellent. That is, as compared with the antennas to which the virtual antennas are not applied, the virtual antennas in accordance with the embodiment of the present invention has relatively excellent RMSE performance. That is, when SNR is 10 dB, RMSE of the virtual antenna is 0.7°, RMSE of the actual antenna is 2.4°, and the accuracy of the DOA estimation value is increased by about 1.4° as compared with the actual antenna.

In accordance with embodiments of the present invention, the method and the apparatus for estimating the DOA using generation of virtual received signals can generate a virtual antenna by using both interpolation and extrapolation so that the resolution can be ensured even when the antenna aperture size is small.

In addition, in accordance with embodiments of the present invention, the method and the apparatus for estimating the DOA using generation of virtual received signals can suppress the grating lobe while maintaining a high resolution.

Furthermore, in accordance with embodiments of the present invention, the method and the apparatus for estimating the DOA using generation of virtual received signals can be applied to the radar for the autonomous vehicle, can accurately recognize the number of actual vehicles through the improved resolution, without mistaking a plurality of vehicles near the front as one vehicle, can precisely monitor accurate forward surveillance, and can effectively prevent a vehicle collision accident.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for estimating a direction of arrival (DOA) of a received signal by generating a plurality of virtual received signals, the method comprising:
   generating a preset number of virtual antennas at preset positions from a plurality of actual antennas;

generating a plurality of virtual received signals received from the virtual antennas; and generating a DOA estimation value through a DOA estimation algorithm using the virtual received signals received from the virtual antennas and received signals received from the actual antennas;

wherein generating the virtual antennas comprises:

setting a sector according to a field of view (FOV) angle range, generating a transform matrix through the set sector, and generating the virtual received signals received from the virtual antennas by using the generated transform matrix; and generating a correlation matrix by combining the received signals received from the virtual antennas and the received signals received from the actual antennas, generating an angle estimation spectrum by using the generated correlation matrix, and generating the DOA estimation value.

2. The method of claim 1, wherein the virtual antennas are disposed between the actual antennas or outside the actual antennas.

3. The method of claim 1, wherein the virtual antennas are disposed at unequal intervals, regardless of the positions of the actual antennas.

4. The method of claim 1, wherein the preset numbers are set considering at least a signal-to-noise ratio (SNR) and intervals of the actual antennas.

5. The method of claim 1, wherein the generating of the virtual antennas further comprises:

determining the preset positions by using a root mean square error (RMSE) of the DOA estimation value.

6. The method of claim 1, further comprising determining the preset positions based on at least one of accuracy of the DOA estimation value or an area of a side lobe and a grating lobe.

7. The method of claim 1, wherein the transform matrix is obtained by using a linear least square (LLS) method based on a relationship between the received signals.

8. The method of claim 1, wherein the DOA estimation algorithm is a Bartlett pseudo algorithm.

9. An apparatus configured for estimation of a direction of arrival (DOA) of a received signal by generation of virtual received signals, the apparatus comprising:

a uniform linear array (ULA) reception antenna comprising a plurality of actual antennas;

a reception unit configured to extract a predetermined signal from received signals received through the actual antennas of the ULA reception antenna and convert the extracted signal into a digital signal; and a signal processing unit configured to receive the digital signal from the reception unit, generate virtual received signals received from a preset number of virtual antennas disposed at preset positions, and generate a DOA estimation value through a DOA estimation algorithm by using the received signals received from the actual antennas and the virtual received signals received from the virtual antennas;

wherein the signal processing unit is configured to set a sector according to a field of view (FOV) angle range, generate a transform matrix through the set sector, generate the virtual received signals received from the virtual antennas by using the generated transform matrix, generate a correlation matrix by combining the virtual received signals received from the virtual antennas and the received signals received from the actual antennas, generate an angle estimation spectrum by using the generated correlation matrix, and generate the DOA estimation value.

10. The apparatus of claim 9, wherein the virtual antennas are disposed between the actual antennas or outside the actual antennas.

11. The apparatus of claim 9, wherein the virtual antennas are disposed at unequal intervals, regardless of positions of the actual antennas.

12. The apparatus of claim 9, wherein the preset numbers are set considering at least a signal-to-noise ratio (SNR) and intervals of the actual antennas.

13. The apparatus of claim 9, wherein the signal processing unit is further configured to determine the preset positions by using a root mean square error (RMSE) of the DOA estimation value.

14. The apparatus of claim 9, wherein the signal processing unit is configured to determine the preset positions based on at least one of accuracy of the DOA estimation value or an area of a side lobe and a grating lobe.

15. The apparatus of claim 9, wherein the transform matrix is obtained by using a linear least square (LLS) method based on a relationship between the received signals.

16. The apparatus of claim 9, wherein the DOA estimation algorithm is a Bartlett pseudo algorithm.

* * * * *